United States Patent
Trautman et al.

(10) Patent No.: US 10,635,653 B2
(45) Date of Patent: Apr. 28, 2020

(54) SYSTEMS AND METHODS FOR IMPLEMENTING A MULTI-HOST RECORD LOCK DEADLOCK FEEDBACK MECHANISM

(71) Applicants: Matthew E Trautman, Roseville, MN (US); Linda J Brock, Roseville, MN (US); Douglas A Fuller, Roseville, MN (US); Edward C Fisher, Bountiful, UT (US); Michael J Rieschl, Roseville, MN (US)

(72) Inventors: Matthew E Trautman, Roseville, MN (US); Linda J Brock, Roseville, MN (US); Douglas A Fuller, Roseville, MN (US); Edward C Fisher, Bountiful, UT (US); Michael J Rieschl, Roseville, MN (US)

(73) Assignee: Unisys Corporation, Blue Bell, PA (US)

( * ) Notice: Subject to any disclaimer, the term of this patent is extended or adjusted under 35 U.S.C. 154(b) by 1044 days.

(21) Appl. No.: 15/133,270

(22) Filed: Apr. 20, 2016

(65) Prior Publication Data
US 2017/0308564 A1 Oct. 26, 2017

(51) Int. Cl.
*G06F 16/23* (2019.01)

(52) U.S. Cl.
CPC .............................. *G06F 16/2336* (2019.01)

(58) Field of Classification Search
CPC .................................................. G06F 16/2336

USPC ......................................................... 707/704
See application file for complete search history.

(56) References Cited

U.S. PATENT DOCUMENTS

| | | | | |
|---|---|---|---|---|
| 5,832,484 | A  * | 11/1998 | Sankaran | G06F 16/2343 |
| 2003/0028638 | A1 * | 2/2003 | Srivastava | G06F 9/524 709/225 |
| 2009/0138882 | A1 * | 5/2009 | Anand | G06F 9/5027 718/104 |
| 2010/0042755 | A1 * | 2/2010 | Fuente | G06F 13/28 710/22 |
| 2010/0125480 | A1 * | 5/2010 | Bai | G06Q 10/06 705/7.11 |
| 2010/0242026 | A1 * | 9/2010 | Bates | G06F 11/362 717/128 |
| 2013/0013833 | A1 * | 1/2013 | Nagpal | G06F 13/14 710/200 |
| 2014/0071905 | A1 * | 3/2014 | Nimmala | H04W 28/18 370/329 |

* cited by examiner

*Primary Examiner* — Michael Pham

(57) ABSTRACT

A method includes retrieving, by a processor, a first entry from a global wait list as a current waiting lock. The method further includes decreasing, by the processor, a deadlock timer of the current waiting lock. The method further includes determining, by the processor, whether the deadlock timer equals zero. The method further includes appending, by the processor, the current waiting lock to an end of a deadlock victim selection list, if the deadlock timer equals zero. The method further includes selecting, by the processor, a victim from the deadlock victim selection list.

20 Claims, 11 Drawing Sheets

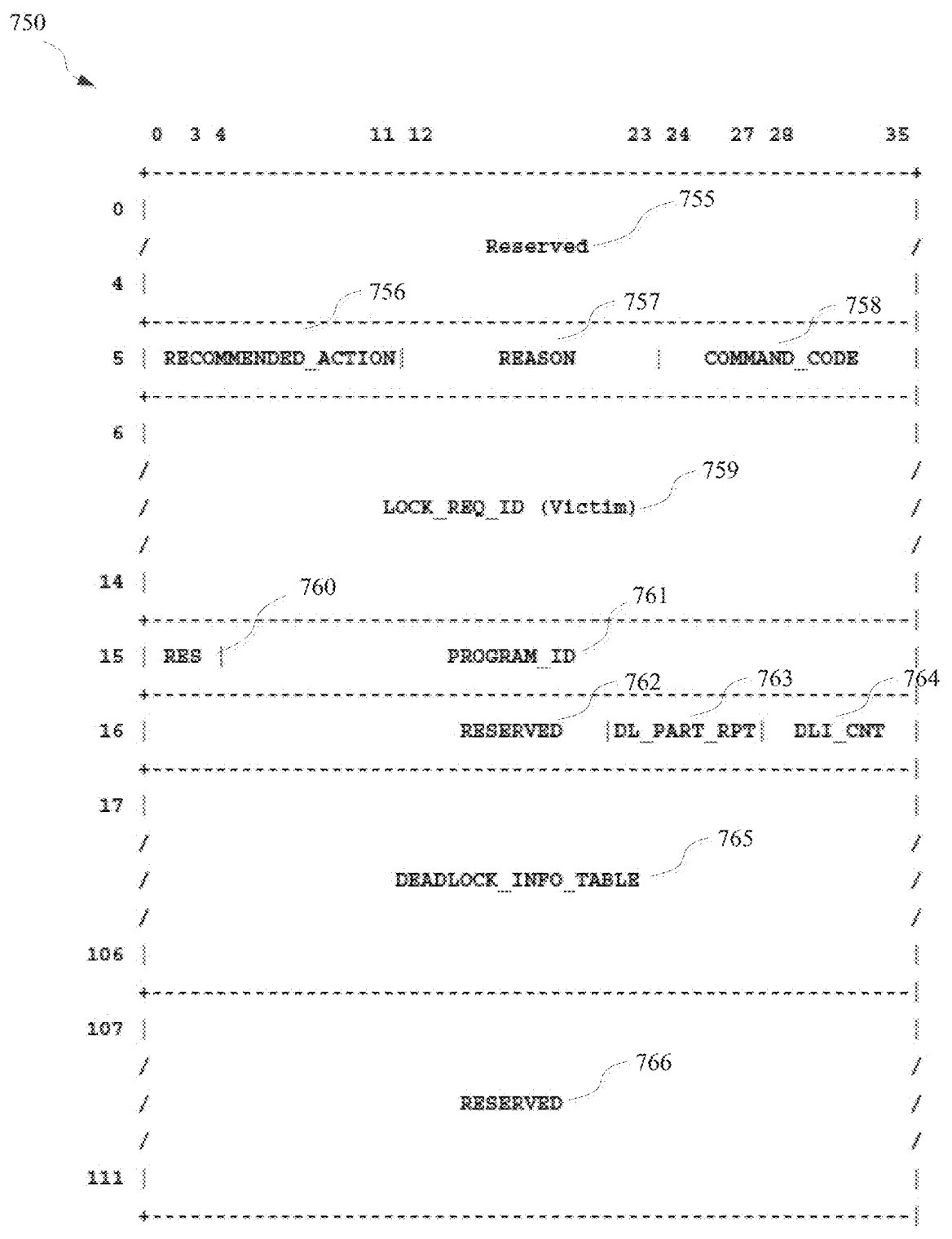

```
               0  3 4              11 12                   23 24    27 28          35
               +----------------------------------------------------------------------+
       0  |                                              755                         |
          /                                 Reserved ──/                              /
       4  |              756                     757                  758             |
          +--------------/-----------------------/--------------------/---------------+
       5  | RECOMMENDED_ACTION  |       REASON        |      COMMAND_CODE      |
          +----------------------------------------------------------------------+
       6  |                                                                          |
          /                                                      759                 /
          /                    LOCK_REQ_ID (Victim) ──/                               /
          /                                                                          /
      14  |         760                           761                                |
          +---------/-----------------------------/-------------------------------+
      15  | RES |                         PROGRAM_ID                              |
          +----------------------------------762-----------763---------764---------+
      16  |                      RESERVED       | DL_PART_RPT |    DLI_CNT         |
          +----------------------------------------------------------------------+
      17  |                                                                          |
          /                                               765                        /
          /                        DEADLOCK_INFO_TABLE ──/                            /
          /                                                                          /
     106  |                                                                          |
          +----------------------------------------------------------------------+
     107  |                                                                          |
          /                                        766                               /
          /                              RESERVED ──/                                /
          /                                                                          /
     111  |                                                                          |
          +----------------------------------------------------------------------+
```

FIG. 7B

SYSTEMS AND METHODS FOR IMPLEMENTING A MULTI-HOST RECORD LOCK DEADLOCK FEEDBACK MECHANISM

FIELD OF THE DISCLOSURE

The instant disclosure relates generally to database management. More specifically, this disclosure relates to embodiments of apparatuses, systems, and methods that manage deadlocks.

BACKGROUND

Databases can be clustered to achieve greater capacity and higher efficiency, e.g., cloud storage, cloud computing, etc. When databases are clustered, a process may need two different objects located in two different databases to proceed. In such a situation, a database management system need to lock the two desired objects for the process to proceed.

Deadlocks occur when an application/process does not use a consistent order in requesting locks for two or more objects. In one embodiment, a deadlock may occur when there are two separate processes both request for the same objects at the same time. For example, process 0100 and process 0200 may both request for objects A1 and B1 at the same time. More specifically, in one embodiment, a deadlock may occur when (1) process 0100 has already locked down object A1; (2) process 0200 has already locked down object B1; (3) process 0100 requests to lock object B1; and (4) process 0200 requests to lock object A1. In this example, neither process 0100 nor process 0200 may proceed because each is waiting for an object that has already been locked by the other, resulting a deadlock. A deadlock situation can be much more complicated when it involves a series of locks.

Embodiments of the invention and their equivalents disclosed herein provide solutions to manage, prevent, and resolve deadlocks.

SUMMARY

The instant disclosure relates generally to database management. More specifically, this disclosure relates to embodiments of apparatuses, systems, and methods that manage deadlocks. According to one embodiment, a method includes retrieving, by a processor, a first entry from a global wait list as a current waiting lock. The method further includes decreasing, by the processor, a deadlock timer of the current waiting lock. The method further includes determining, by the processor, whether the deadlock timer equals zero. The method further includes appending, by the processor, the current waiting lock to an end of a deadlock victim selection list, if the deadlock timer equals zero. The method further includes selecting, by the processor, a victim from the deadlock victim selection list.

According to another embodiment, a computer program product includes a non-transitory computer-readable medium comprising instructions which, when executed by a processor of a computing system, cause the processor to perform the steps of retrieving a first entry from a global wait list as a current waiting lock. The processor further performs the step of decreasing a deadlock timer of the current waiting lock. The processor further performs the step of determining whether the deadlock timer equals zero. The processor further performs the step of appending the current waiting lock to an end of a deadlock victim selection list, if the deadlock timer equals zero. The processor further performs the step of selecting a victim from the deadlock victim selection list.

According to another embodiment, an apparatus includes a memory; and a processor coupled to the memory, the processor being configured to perform the steps of retrieving a first entry from a global wait list as a current waiting lock. The processor further performs the step of decreasing a deadlock timer of the current waiting lock. The processor further performs the step of determining whether the deadlock timer equals zero. The processor further performs the step of appending the current waiting lock to an end of a deadlock victim selection list, if the deadlock timer equals zero. The processor further performs the step of selecting a victim from the deadlock victim selection list.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the concepts and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed systems and methods, reference is now made to the following descriptions taken in conjunction with the accompanying drawings.

FIG. 7B is an example of a delayed response message (DRM) according to one embodiment of the disclosure.

DETAILED DESCRIPTION

Database systems may be clustered to achieve greater performance and availability. A hardware device, e.g., a lock engine, may be used to coordinate the lock requested by a process executing on the database.

A clustered environment may allow each system to have its own local files, databases, and application groups along with shared files and one or more shared application groups. Local files and databases may only be accessed by a single system. Shared files and databases may be simultaneously accessible from all systems in the cluster.

A lock engine provides the actions of locking, establishing a communication path among the systems for coordinated actions. In one embodiment, extended processing complex-locking (XPC-L) may include a lock engine. Connection to the XPC-L is via a special I/O processor that operates with low latencies. The lock engine may provide deadlock detection and the ability to free up locks of failed applications.

Steps of methods, e.g., methods 200, 300, 400 and 500, are processor-executable instructions, for example, instructions written as programming codes. An instruction may be executed by any suitable processor, for example, an x86 processor. An instruction may be programmed in any suitable computer language, for example, machine codes, assembly language codes, C language codes, C++ language codes, Fortran codes, Java codes, Matlab codes, or the like. The sequences of the steps of the methods 200, 300, 400 and 500 may be changed without departing the scope of the disclosure.

Figure 1:
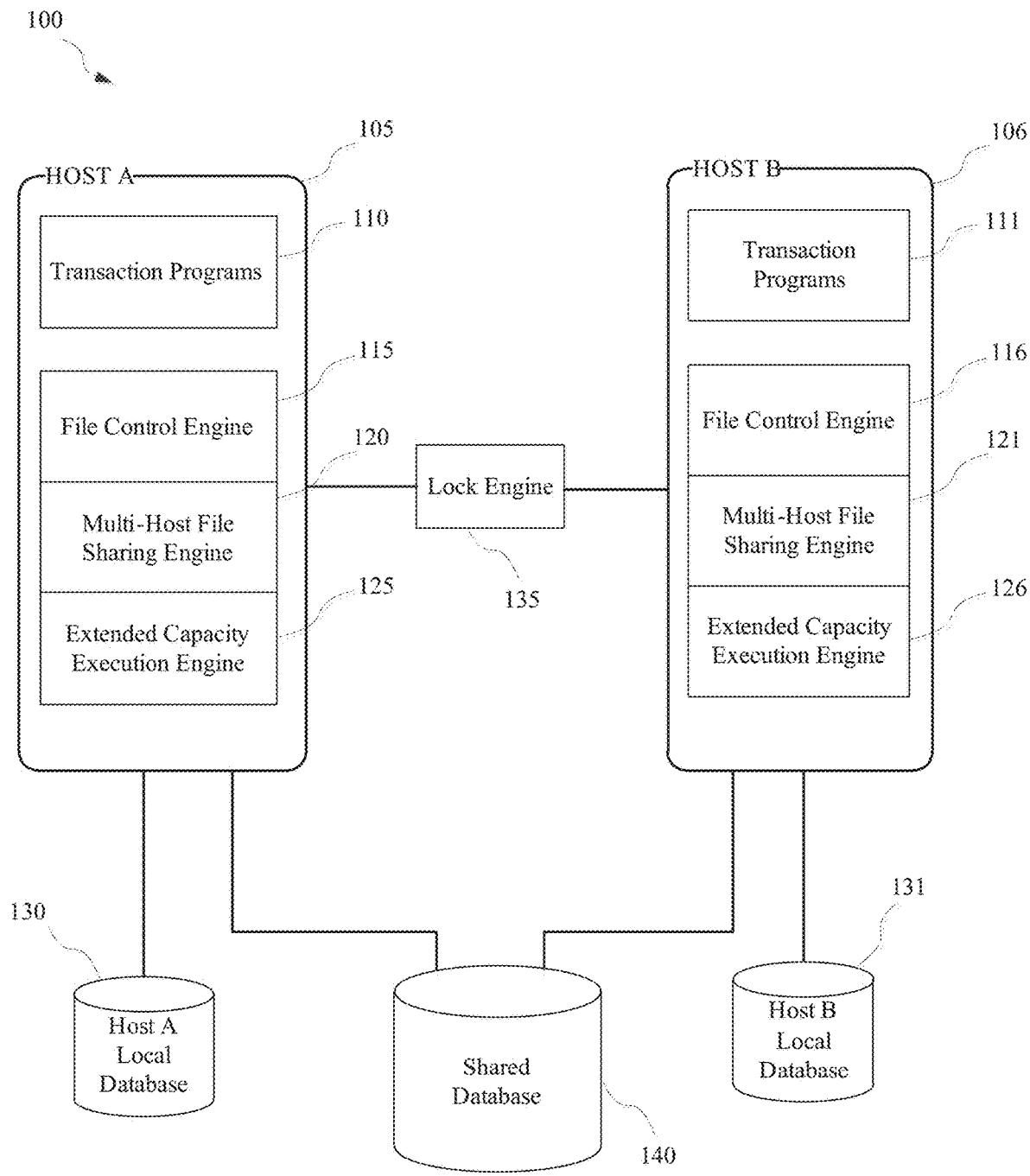
FIG. 1 is a schematic diagram of a clustered database with two host systems according to one embodiment of the disclosure.

FIG. 1 is a schematic diagram of a clustered database 100 with two host systems according to one embodiment of the disclosure. FIG. 1 is an example of a clustered database including Host A 105 and Host B 106. Host A 105 and Host B 106 may each serves as a traditional one-host transaction system.

Transactions programs 110 and 111 may be the programs, processes, and/or applications executed on Host A 105 and Host B 106, respectively.

As shown in FIG. 1, Host A 105 has a local database 130. Host B 106 has a local database 131. Host A 105 and Host B 106 both have access to a shared database 140. However, Host A 105 does not have access to the local database 131 of Host B 106. Similarly, Host B 106 does not have access to the local database 130 of Host A 105.

In one embodiment, local databases 130, 131 may only contain data that pertains only to a local host and local applications. Local database 130, 131 may not contain any recoverable data for capacity that requires sharing resources from both Host A 105 and Host B 106, e.g., extended transaction capacity (XTC).

As shown in FIG. 1, Host A 105 and Host B 106 each includes a multi-host file sharing engine 120, 121. In one embodiment, the multi-host file sharing engine 120, 121 may be a piece of software or a hardware. The multi-host file sharing engine 120, 121 may provide input/output data access from each host 105, 106 to the shared database 140.

As shown in FIG. 1, Host A 105 and Host B 106 each includes an extended capacity execution engine 125, 126. In one embodiment, the extended capacity execution engine 125, 126 may allow transaction programs 110, 111 to have concurrent access from multiple hosts 105, 106 to a common database, e.g., shared database 140, locked by the lock engine 135. The concurrent access provided by the extended capacity execution engine 125, 126 may increase the efficiency and throughput of the clustered database 100. In another embodiment, the extended capacity execution engine 125, 126 may enable the file control engine 115, 116 to work with the lock engine 135 to control database access and handle the host-to-host communications necessary for file sharing and for transaction scheduling across hosts. In one embodiment, the extended execution engine 125, 126 may be a piece of software or hardware.

As shown in FIG. 1, the clustered database 100 includes a lock engine 135. In one embodiment, the lock engine 135 may be a hardware device connected to all hosts 105, 106 in a clustered database 100. In one embodiment, the lock engine 135 may provide hardware locking. In another embodiment, the lock engine 135 may provide supporting software outside the hosts 105, 106 to allow access to shared database 140. In one embodiment, by controlling access, the lock engine 135 may include features of credential checking and authentication verification process in increasing the security, maintaining the integrity of the shared database 140. In another embodiment, the extended capacity execution engines 125, 126 may support the functionality of the lock engine 135.

Various methods that prevent a deadlock from happening or resolve a deadlock after it has occurred can be implemented on the lock engine 135. In other embodiments, various methods that prevent a deadlock from happening or resolve a deadlock after it has occurred can be implemented on the various components of the hosts 105, 106, e.g., file control engines 115, 116, multi-host file sharing engines 120, 121, and extended capacity execution engine 125, 126.

In one embodiment, the deadlocks can be prevented before they arise. In one embodiment, the prevention may be done by performing checks whenever a process requests a lock on an entity that is already locked by another process.

In another embodiment, if a second process requests an entity that is already locked by a first process that is already queued, an error message is given to the second process. The second process is expected to release all of its locks or abort processing. The aborted process may be rescheduled to process at a later time. It is likely that the rescheduled process will not encounter a repeated deadlock. In yet another embodiment, a deadlock can be resolved after it has occurred, e.g. a deadlock detection.

Figure 2:
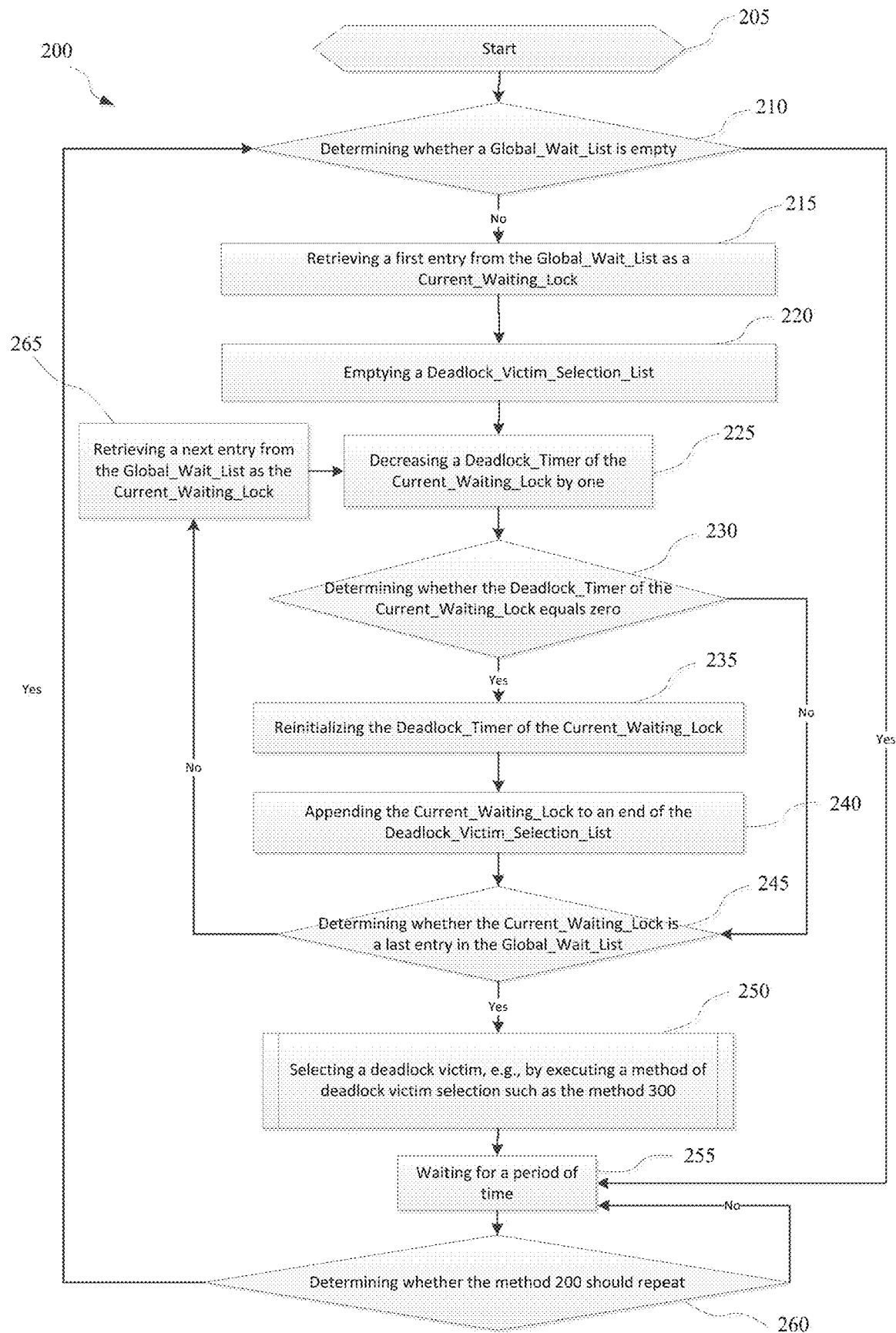
FIG. 2 is a method for detecting a deadlock according to one embodiment of the disclosure.
Figure 3:
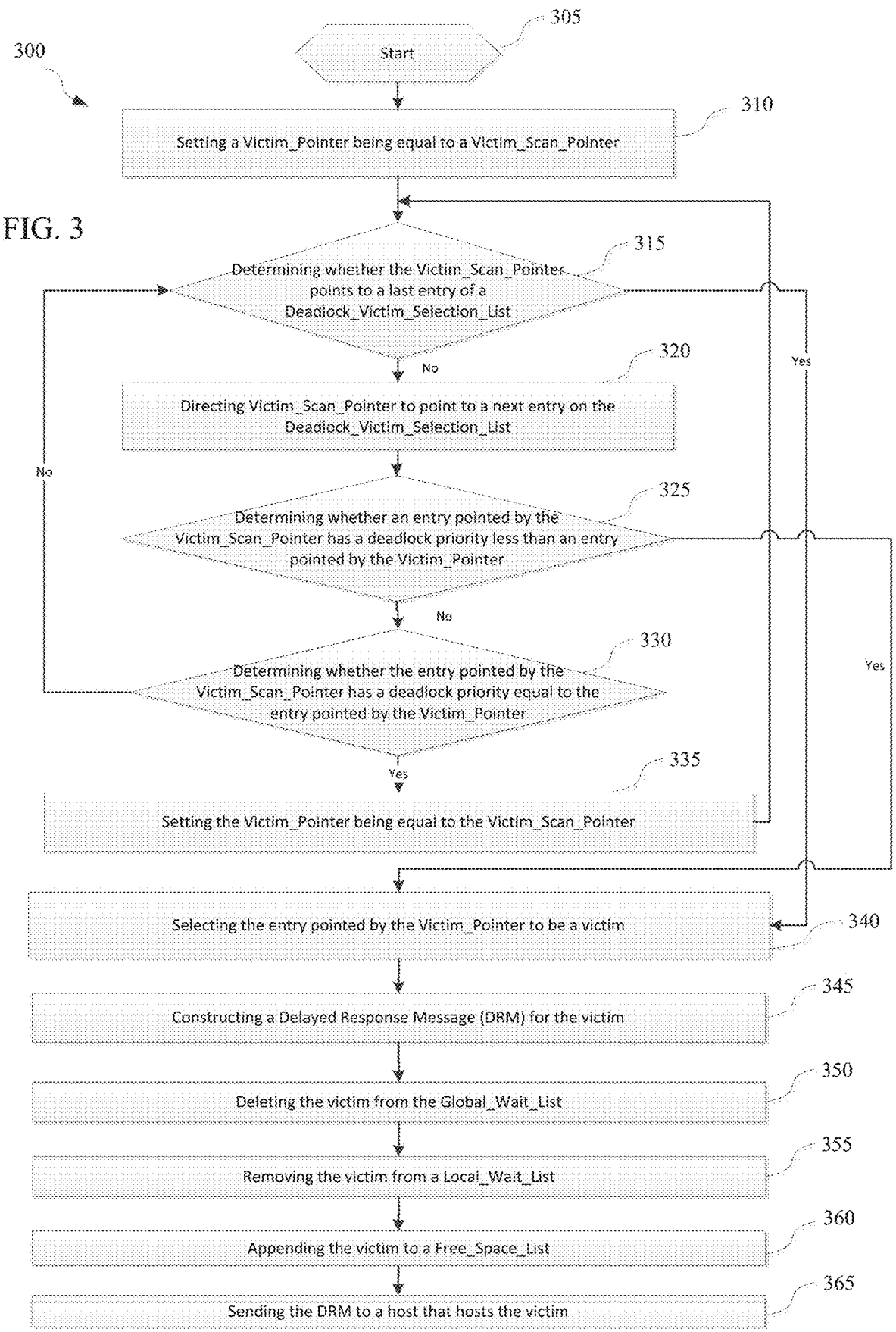
FIG. 3 is a method for selecting a deadlock victim according to one embodiment of the disclosure.
Figure 4:
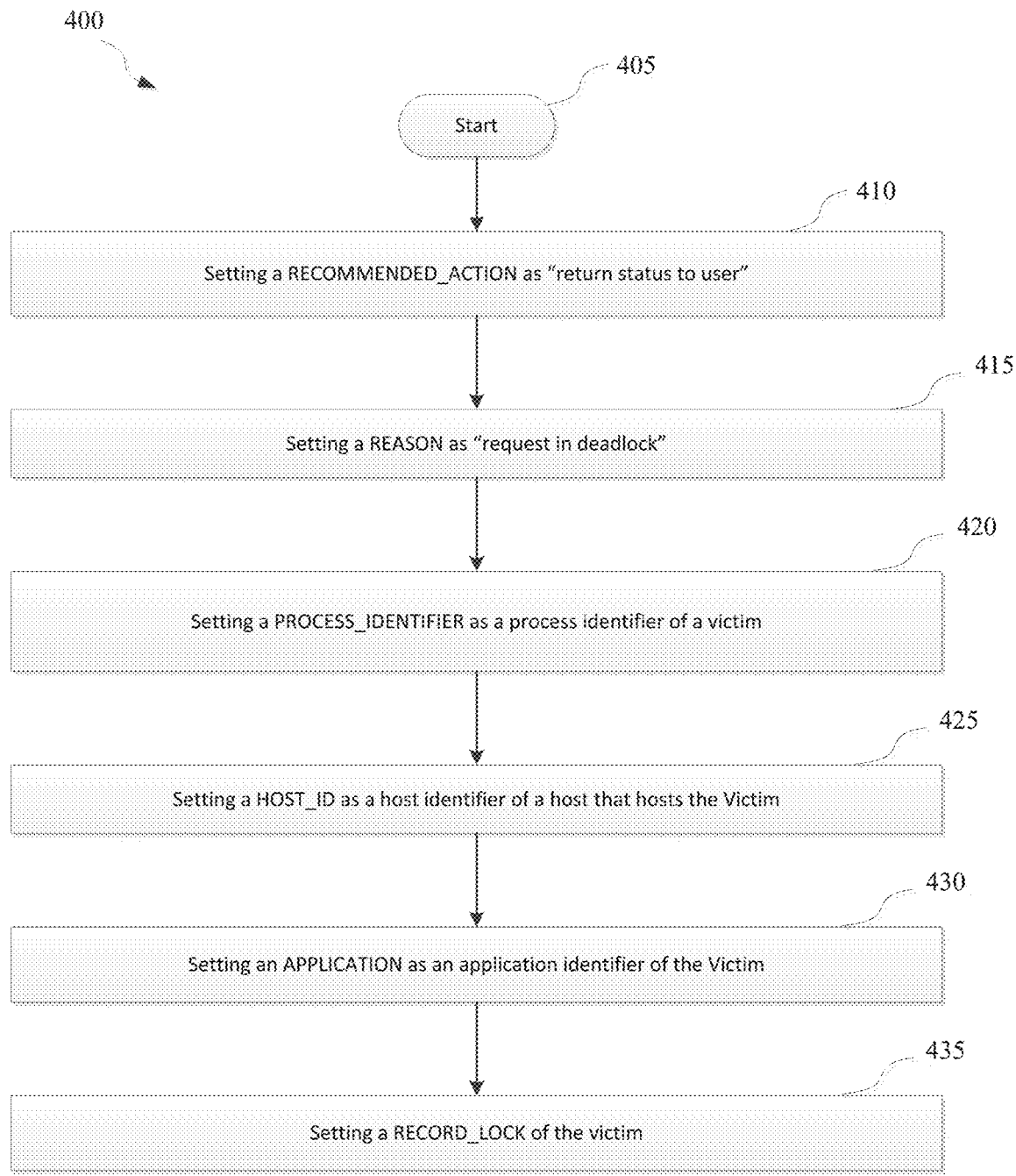
FIG. 4 is a method for constructing a delayed response message (DRM) according to one embodiment of the disclosure.
Figure 5:
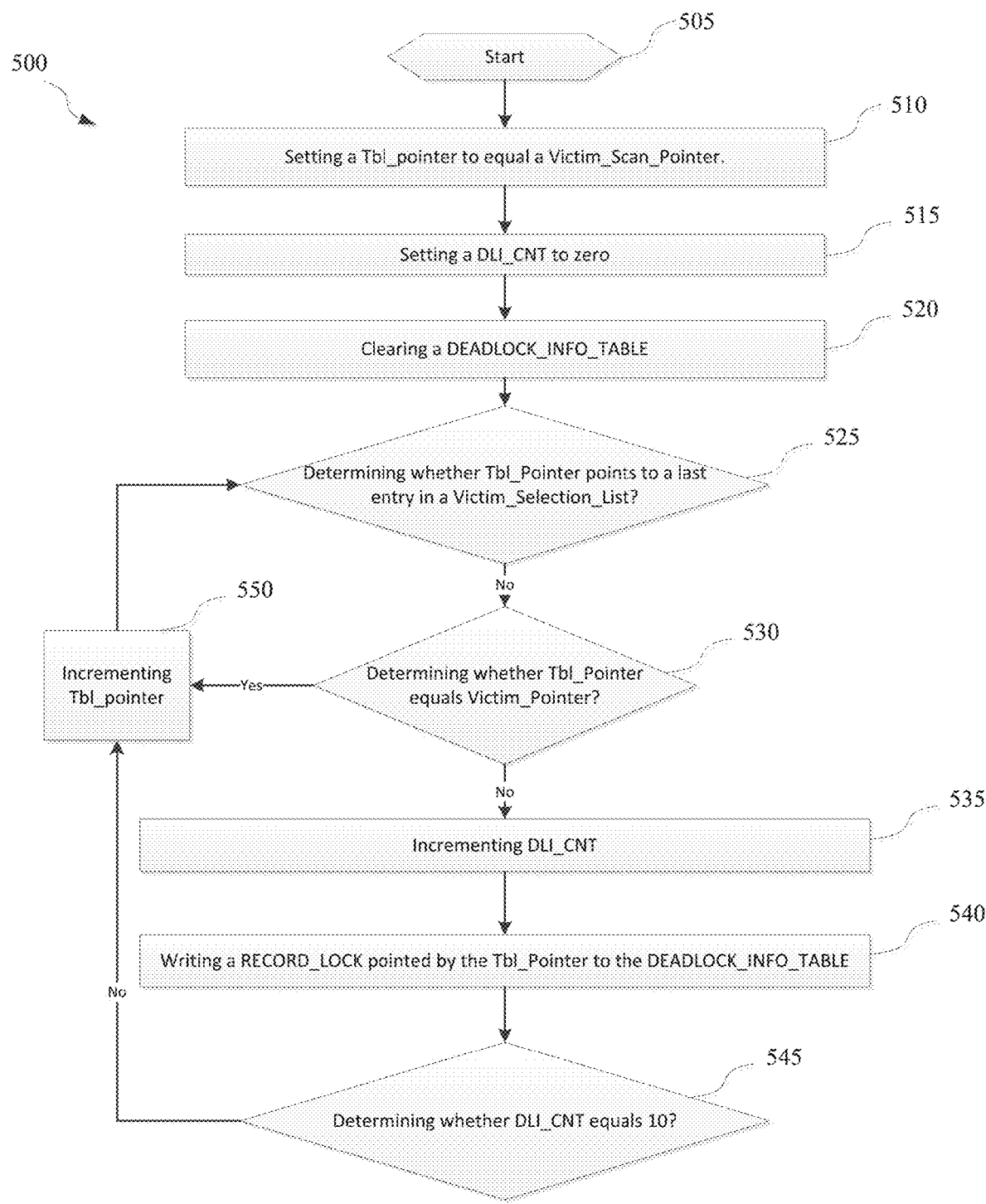
FIG. 5 is a method for appending deadlock report information to a delayed response message (DRM) according to one embodiment of the disclosure.
Figure 9:
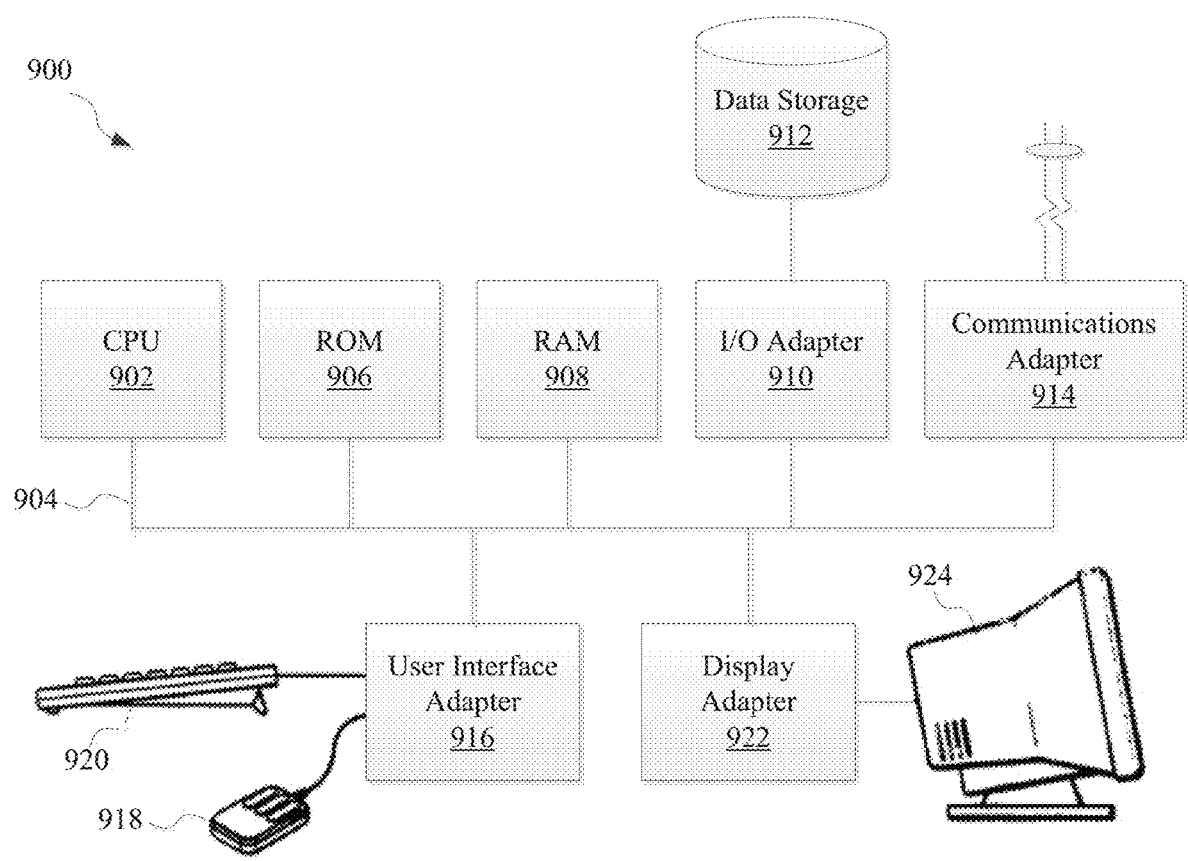
FIG. 9 is a block diagram illustrating a computer system according to one embodiment of the disclosure.
Figure 10A:
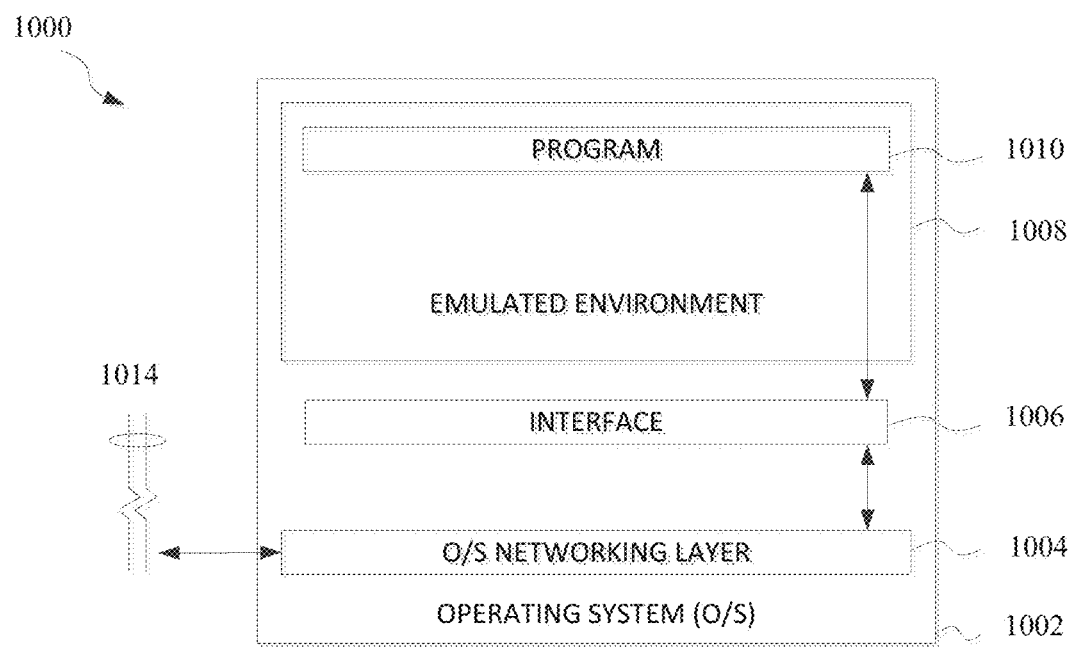
FIG. 10A is a block diagram illustrating a server hosting an emulated software environment for virtualization according to one embodiment of the disclosure.
Figure 10B:
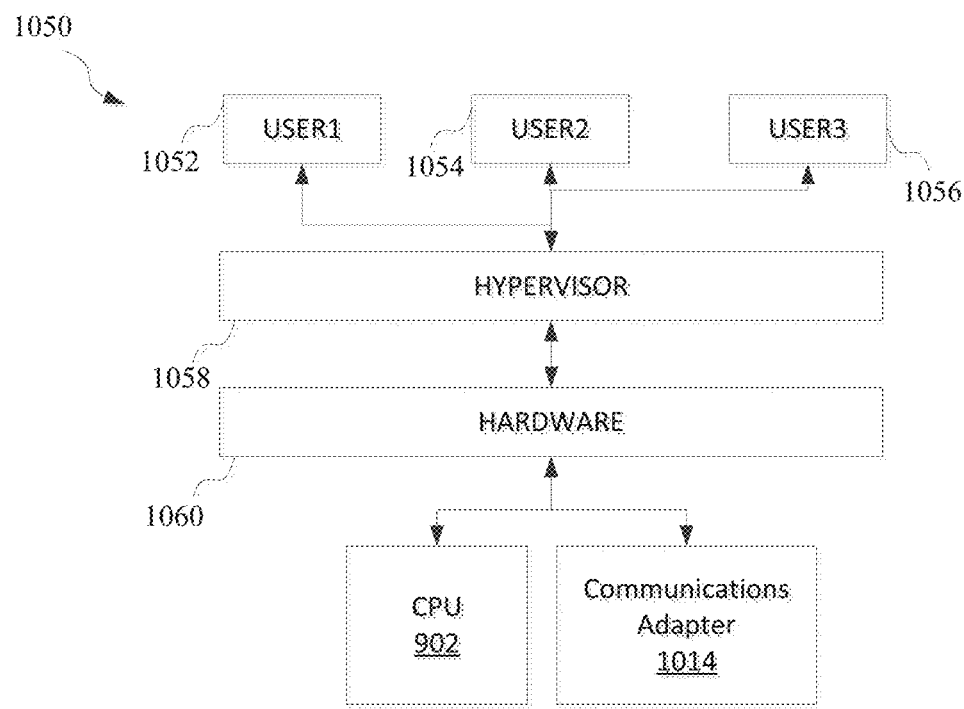
FIG. 10B is a block diagram illustrating a server hosing an emulated hardware environment according to one embodiment of the disclosure.

It is noted that each step of the method 200 in FIG. 2, method 300 in FIG. 3, method 400 in FIG. 4, and/or method 500 in FIG. 5 may be executed by a processor, e.g., CPU 902 shown in FIG. 9 and FIG. 10B.

FIG. 2 is a method 200 for detecting a deadlock according to one embodiment of the disclosure. The method 200 for detecting a deadlock starts at block 205. The method 200 proceeds to block 210, which includes determining whether a Global_Wait_List is empty. If the determination is "yes" at block 210, the method 200 proceeds to block 255, which includes waiting for a period of time. If the determination is "no" at block 210, the method 200 proceeds to block 215, which includes retrieving a first entry of the Global_Wait_List as a Current_Waiting_Lock. The method 200 proceeds to block 220, which includes emptying a Deadlock_Victim_Selection_List. The method 200 proceeds to block 225, which includes decreasing a Deadlock_Timer of the Current_Waiting_Lock by one. The method 200 proceeds to block 230, which includes determining whether the Deadlock_Timer of the Current_Waiting_Lock equals zero. If the determination at block 230 is "yes," the method 200 proceeds to block 235, which includes reinitializing the Deadlock_Timer of the Current_Waiting_Lock. If the determination at block 230 is "no," the method 200 proceeds to block 245, which includes determining whether the Current_Waiting_Lock is a last entry in the Global_Wait_List. The method 200 proceeds to block 240, which includes appending the Current_Waiting_Lock to an end of a Deadlock_Victim_Selection_List. The method 200 proceeds to block 245, which includes determining whether the Current_Waiting_Lock is a last entry in the Global_Wait_List. If the determination at block 245 is "yes," the method 200 proceeds to block 250, which includes selecting a deadlock victim. At block 250, selecting a deadlock victim can be accomplished by, for example, executing a method of deadlock victim selection such as the method 300 shown in FIG. 3. If the determination at block 245 is "no," the method 200 proceeds to block 265, which includes retrieving a next Current_Waiting_Lock from a next entry of the Global_Wait_List. The method 200 proceeds to block 255, which includes waiting for a period of time. The method 200 proceeds to block 260, which includes determining whether the method 200 should repeat. If the determination at block 260 is "yes," the method 200 proceeds to block 210. If the determination at block 260 is "no," the method 200 proceeds to block 255, which includes waiting for a period of time. After 265, the method 200 proceeds to block 225.

The term "Global_Wait_List" may refer to a dedicated space in an electric/electromagnetic memory device that stores a list of the processes in a clustered database that are waiting for a resource. The term "Global_Wait_List" may refer to a parameter in the method 200 that can be accessed by an applicable computer software/hardware.

The term "Current_Waiting_Lock" may refer to a dedicated space in an electric/electromagnetic memory device that includes an entry of a process that is currently waiting for a lock. In one embodiment, the Current_Waiting_Lock may be a lock entry on the Global_Wait_List describing the lock that is currently being evaluated whether it may be involved in a deadlock. The term "Current_Waiting_Lock" may refer to a parameter in the method 200 that can be accessed by an applicable computer software/hardware.

The term "Deadlock_Timer" may refer to a dedicated space in an electric/electromagnetic memory device that stores an indication of the time period of a specific deadlock has been occurred. The term "Deadlock_Timer" may refer to a parameter in the method 200 that can be accessed by an applicable computer software/hardware.

The term "Deadlock_Victim_Selection_List" may refer to a dedicated space in an electric/electromagnetic memory device that stores a list of the processes that may be selected as a victim, wherein the lock request of the victim may be cancelled or delayed. The term "Deadlock_Victim_Selection_List" may refer to a parameter in the method 200 that can be accessed by an applicable computer software/hardware.

At 210, the method 200 determines whether a Global_Wait_List is empty. In one embodiment, if the Global_Wait_List is empty, that means there is currently no process in a clustered database, e.g., the clustered database 100, that is waiting for a resource. As shown in FIG. 2, if the Global_Wait_List is empty, the method 200 proceeds to block 255, which includes waiting for a period of time.

At 210, if the Global_Wait_List is not empty, the method 200 proceeds to block 215, which includes retrieving a first entry of the Global_Wait_List as a Current_Waiting_Lock. The process or entry identified by the Current_Waiting_Lock is then being reviewed to determine whether it involves in a deadlock.

At 215, a first entry of the Global_Wait_List is retrieved as a Current_Waiting_Lock. In one embodiment, the retrieving of an entry from the Global_Wait_List at 215 can be first-in first-out. In another embodiment, the retrieving of an entry from the Global_Wait_List at 215 can be first-in last-out.

At 220, the method 200 empties a Deadlock_Victim_List. Emptying the Deadlock_Victim_List may be a part of the initialization process for resolving deadlocks.

At 225, a Deadlock_Timer of the Current_Waiting_Lock is reduced by one. The Deadlock_Timer may be an indication showing how long a particular process has been waiting for a resource. The Deadlock Timer can be used as one of the considerations to decide the priority to be selected as a victim among the waiting processes.

At 230, the method 200 determines whether the Deadlock_Timer of the Current_Waiting_Lock equals zero. In one embodiment, the Deadlock_Timer being zero indicates that the Current_Waiting_Lock has been waiting for resources for a period of time. In another embodiment, the Deadlock_Timer being zero indicates that the Current_Waiting_Lock has been reviewed by the method 200 for a number of times.

At 230, if the Deadlock_Timer of the Current_Waiting_Lock equals zero, the Deadlock_Timer is reinitialized at 235 and subsequently the Current_Waiting_Lock is appended to an end of the Deadlock_Victim_Selection_List at 240. In one embodiment, the sequence of block 235 and block 240 may be exchanged.

At 230, if the Deadlock_Timer of the Current_Waiting_Lock does not equal zero, the method 200 proceeds to 245. At block 245, the method 200 determines whether the entry of the Current_Waiting_Lock is a last entry in the Global_Wait_List. The Current_Waiting_Lock being the last entry in the Global_Wait_List may indicate that there is no other process waiting for resources, and the method 200 proceeds to 250. On the other hand, the Current_Waiting_Lock not being the last entry in the Global_Wait_List may indicate that there are additional processes waiting for resources, and the method 200 proceeds to 265.

At 250, the method 200 selects a deadlock victim. In one embodiment, the deadlock victim may be selected from the Deadlock_Victim_Selection_List. In another embodiment, the method 200 may incorporate the method 300 shown in FIG. 3 for selecting the deadlock victim. In one embodiment, the selected deadlock victim is a process that may be cancelled or temporarily delayed for processing to free up the resources so that a deadlock is resolved.

At 255, the method 200 waits for a period of time.

At 260, the method 200 determines whether the method 200 should repeat it itself. If the determination at block 260 is "yes," the method 200 proceeds to block 210. If the determination at block 260 is "no," the method 200 proceeds to block 255, which includes waiting for a period of time.

At 265, the method 200 retrieves a next entry from the Global_Wait_List as the Current_Waiting_Lock. After 265, the method 200 proceeds to block 225.

FIG. 3 is a method 300 for selecting a deadlock victim according to one embodiment of the disclosure. The method 300 can be implemented in the clustered database 100. The method 300 can be used in combination with the method 200. For example, the method 300 can be included in the block 250 of method 200. The method 300 may include method 400. For example, block 345 may include method 400. The method 300 may include method 500. For example block 345 may include method 500. The method 300 may include the deadlock report shown in FIGS. 6A and 6B. The method may include the DRMs as shown in FIGS. 7A and 7B. The method 300 can be implemented in any component of the computer network 800 shown in FIG. 8. The method 300 can be implemented in the computer system 900 shown in FIG. 9. The method 300 can be implemented in the servers 1000 and 1050. In one embodiment, the method 300 can be implemented in the emulated environment 1008.

The method 300 starts at 305. The method 300 proceeds to block 310, which includes setting a Victim_Pointer being equal to a Victim_Scan_Pointer. The method 300 proceeds to block 315, which includes determining whether the Victim_Scan_Pointer points to a last entry of a Deadlock_Victim_Selection_List. If the determination at 315 is "yes," the method 300 proceeds to block 340, which includes selecting the entry pointed by the Victim_Pointer to be a victim. If the determination at 315 is "no," the method 300 proceeds to block 320, which includes directing Victim_Scan_Pointer to point to a next entry on the Deadlock_Victim_Selection_List. After block 320, the method 300 proceeds to block 325, which includes determining whether an entry pointed by the Victim_Scan_Pointer has a deadlock priority less than an entry pointed by the Victim_Pointer. If the determination at 325 is "yes," the method 300 proceeds to 340, which includes selecting the entry pointed by the Victim_Pointer to be a victim. If the determination at 325 is "no," the method 300 proceeds to block 330, which includes determining whether the entry pointed by the Victim_Scan_Pointer has a deadlock priority equal to the entry pointed by the Victim_Pointer. If the determination at 330 is "yes," the method 300 proceeds to block 335, which includes setting the Victim_Pointer being equal to the Victim_Scan_Pointer. If the determination at 330 is "no," the method 300 proceeds to block 315, which includes determining whether the Victim_Scan_Pointer points to a last entry of a Deadlock_Victim_Selection_List. After 335, the method 300 proceeds to block 315, which includes determining whether the Victim_Scan_Pointer points to a last entry of a Deadlock_Victim_Selection_List. After block 340, the method 300 proceeds to block 345, which includes constructing a delayed response message (DRM) for the victim. The method 300 proceeds to block 350, which includes deleting the victim from the Global_Wait_List. The method 300 proceeds to block 355, which includes removing the victim from a Local_Wait_List. The method 300 proceeds to block 360, which includes appending victim to a Free_Space_List. The method 300 proceeds to block 365, which includes sending DRM to a host that hosts the victim.

The term "victim" may refer to a process that is involved in a deadlock and may be deleted or processing delayed so that the deadlock is resolved.

The term "Victim_Pointer" may refer to a dedicated space in an electric/electromagnetic memory device that stores information identifying a potential victim. The term "Victim_Pointer" may refer to a parameter in the method 300 that can be accessed by an applicable computer software/hardware.

The term "Victim_Scan_Pointer" may refer to a dedicated space in an electric/electromagnetic memory device that stores information identifying a potential victim. The term "Victim_Scan_Pointer" may refer to a parameter in the method 300 that can be accessed by an applicable computer software/hardware.

The term "Deadlock_Victim_Selection_List" may refer to a dedicated space in an electric/electromagnetic memory device that stores a list of the processes that may be selected as a victim, wherein the lock request of the victim may be cancelled or delayed. The term "Deadlock_Victim_Selection_List" may refer to a parameter in the method 300 that can be accessed by an applicable computer software/hardware.

The term "Global_Wait_List" may refer to a dedicated space in an electric/electromagnetic memory device that stores a list of the processes in a clustered database that are waiting for a resource. The term "Global_Wait_List" may refer to a parameter in the method 300 that can be accessed by an applicable computer software/hardware.

The term "Local_Wait_List" may refer to a dedicated space in an electric/electromagnetic memory device that stores a list of the processes hosted on a specific host (e.g., Host A 105 or Host B 106) that are waiting for a resource. The term "Local_Wait_List" may refer to a parameter in the method 300 that can be accessed by an applicable computer software/hardware.

The term "Free_Space_List" may refer to a dedicated space in an electric/electromagnetic memory device that stores a list of the processes that were once selected as victims and being cancelled or delayed from being processed. The term "Free_Space_List" may refer to a parameter in the method 300 that can be accessed by an applicable computer software/hardware.

At 310, the method 300 sets a Victim_Pointer being equal to a Victim_Scan_Pointer. In one embodiment, block 310 may be one of the measures to initialize method 300.

At 315, the method 300 determines whether the Victim_Scan_Pointer points to a last entry of a Deadlock_Victim_Selection_List. If the Victim_Scan_Pointer points to a last entry of a Deadlock_Victim_Selection_List, then the method 300 proceeds to block 340 that includes selecting the entry pointed by the Victim_Pointer to be a victim. If the entry pointed by the Victim_Scan_Pointer is not the last entry of the Deadlock_Victim_Selection_List, then the method 300 proceeds to block 320, which includes directing Victim_Scan_Pointer to a next entry on the Deadlock Victim Selection List.

In one embodiment, the purpose of blocks 315 and 320 is that if there are more than one entry in the Deadlock_Victim_Selection_List, the Victim_Scan_Pointer and the Victim_Pointer may point to different entries to compare their deadlock priorities. In one embodiment, the entry that has a higher deadlock priority is selected to be a victim. In one embodiment, the deadlock priority is expressed in numerical values (e.g., 0, 1, 2, 3, etc), wherein higher numerical value indicates lower deadlock priority, or vice versa. For example, on the Deadlock_Victim_Selection_List, if entry A has a deadlock priority value of 3 and entry B has a deadlock priority value of 1, then entry B (entry B has a higher deadlock priority compared to entry A) may be selected to be a victim and get cancelled.

It is noted that the above embodiments do not limit the scope of this disclosure. In one embodiment, it is also possible that higher numerical value can represent higher deadlock priority. In yet another embodiment, it is possible that the entry with lower deadlock priority can be selected to be a victim.

At 325, the method 300 determines whether an entry pointed by the Victim_Scan_Pointer has a deadlock priority less than an entry pointed by the Victim_Pointer. In one embodiment, the deadlock priority is expressed in numerical values (e.g., 0, 1, 2, 3, etc), wherein higher numerical value indicates lower deadlock priority. If the entry pointed by the Victim_Scan_Pointer has a deadlock priority less than an entry pointed by the Victim_Pointer, the method 300 proceeds to block 340, which includes selecting the entry pointed by the Victim_Pointer to be a victim. Stating in another way, the entry with higher deadlock priority (e.g., lower numerical value, Victim_Pointer) is selected to be the victim.

At 325, if the entry pointed by the Victim_Scan_Pointer has a deadlock priority less than an entry pointed by the Victim_Pointer, the method 300 proceeds to block 330, which includes determining whether the entry pointed by the Victim_Scan_Pointer has a priority equal to the entry pointed by the Victim_Pointer.

At 330, if the entry pointed by the Victim_Scan_Pointer has a priority equal to the entry pointed by the Victim_Pointer, the method 300 proceeds to block 335, which includes setting the Victim_Pointer being equal to the Victim_Scan_Pointer. At 330, if the entry pointed by the Victim_Scan_Pointer does not have a priority equal to the entry pointed by the Victim_Pointer, the method 300 proceeds to block 315, which includes determining whether the Victim_Scan_Pointer points to a last entry of a Deadlock_Victim_Selection_List.

At 340, the method 300 sets the entry pointed by the Victim_Pointer to be a victim. The entry that is victim may be cancelled to release the locked resources and resolve the deadlock it is involved.

At 345, the method 300 constructs a delayed response message (DRM) for the victim. In one embodiment, block 345 may include the method 400 shown in FIG. 4.

At 350, the method 300 includes deleting the victim from the Global_Wait_List. In one embodiment, the Global_Wait_List is a list of the processes in a clustered database (e.g., the clustered database 100 in FIG. 1) that are waiting for a resource.

At 355, the method 300 includes removing the victim from a Local_Wait_List. In one embodiment, the Local_Wait_List is a list of the processes hosted on a specific host (e.g., Host A 105 or Host B 106) that are involved in a deadlock and is waiting for a resource.

At 360, the method 300 includes appending victim to a Free_Space_List. In one embodiment, Free_Space_List is a list of the processes that were selected as a victim. In another embodiment, the entries on the Free_Space_List may be cancelled or delayed to resolve a deadlock. In another embodiment, the entries on the Free_Space_List may be processed at a later time when a repeated deadlock is not likely to happen again.

At 365, the method 300 includes sending DRM to a host that hosts the victim.

FIG. 4 is a method 400 for constructing a delayed response message (DRM) according to one embodiment of the disclosure. The method 400 can be implemented in any component of a clustered database, e.g., the clustered database 100. In one embodiment, the method 400 may be implemented in the lock engine 135. The method 400 can be included in method 200. For example, method 400 can be included in block 250. The method 400 can be included in method 300. For example, method 400 can be included in block 345. The method 400 can be used in combination with method 500. The method 400 can be used in combination with the deadlock report shown in FIGS. 6A and 6B. The method 400 can be used to generate the DRMs as shown in FIGS. 7A and 7B. The method 400 can be implemented in any component of the computer network 800 shown in FIG. 8. The method 400 can be implemented in the computer system 900 shown in FIG. 9. The method 400 can be implemented in the servers 1000 and 1050. In one embodiment, the method 400 can be implemented in the emulated environment 1008.

Method 400 starts at block 405. The method 400 proceeds to block 410, which includes setting a RECOMMENDED_ACTION as "return status to user." The method 400 proceeds to block 415, which includes setting a REASON as "request in deadlock." The method 400 proceeds to block 420, which includes setting PROCESS_IDENTIFIER as a process identifier of a victim. The method 400 proceeds to block 425, which includes setting a HOST_ID as a host identifier of a host that hosts the victim. The method 400 proceeds to block 430, which includes setting an APPLICATION as an application identifier of the victim. The method 400 proceeds to block 435, which includes setting a RECORD_LOCK the victim. It is noted that the sequence of the blocks in method 400 are exemplary only. The sequence of the blocks in method 400 can be changed without departing the scope of the disclosure.

At block 410, the method 400 sets a RECOMMENDED_ACTION as "return status to user." In one embodiment, the RECOMMENDED ACTION is the recommended action status that will be sent to the host.

At block 415, the method 400 sets a REASON as "request in deadlock." In one embodiment, REASON is the reason status associated with the recommended action.

The method 400 proceeds to block 420, which includes setting PROCESS_IDENTIFIER as a process identifier of a victim. In one embodiment, the PROCESS_IDENTIFIER may be an identification of a request/process that is involved in a lock. In one embodiment, the PROCESS_IDENTIFIER may be the LOCK_REQ_ID shown in FIGS. 7A and 7B.

The method 400 proceeds to block 425, which includes setting a HOST_ID as a host identifier of a host that hosts the victim. In one embodiment, the HOST_ID is an identifier of a host that contains the process entry associated with the victim.

The method 400 proceeds to block 430, which includes setting an APPLICATION as an application identifier of the victim. In one embodiment, the APPLICATION is an identifier of the application that includes the process entry associated with the victim.

The method 400 proceeds to block 435, which includes setting a RECORD_LOCK of the victim. It is noted that the sequence of the blocks in method 400 are exemplary only. In one embodiment, RECORD LOCK is the identification information of the victim.

FIG. 5 is a method 500 for appending deadlock report information to a delayed response message (DRM) according to one embodiment of the disclosure. The method 500 can be implemented in any component of a clustered database, e.g., the clustered database 100. In one embodiment, the method 500 may be implemented in the lock engine 135. The method 500 can be included in method 200. For example, method 500 can be included in block 250. The method 500 can be included in method 300. For example, method 500 can be included in block 345. The method 500 can be used in combination method 400. The method 500 can be used in combination with the deadlock report shown in FIGS. 6A and 6B. The method 500 can be used to generate the DRM as shown in FIGS. 7A and 7B. The method 500 can be implemented in any component of the computer network 800 shown in FIG. 8. The method 500 can be implemented in the computer system 900 shown in FIG. 9. The method 500 can be implemented in the servers 1000 and 1050. In one embodiment, the method 500 can be implemented in the emulated environment 1008.

Method 500 is an embodiment that generates a deadlock reporting table that provides up to a certain number of processes, e.g., nine, other than the victim itself that may involve in a deadlock. These additional processes provides valuable information for system manager for trouble shooting and identifying the cause of deadlocks.

In FIG. 5, method 500 starts at 505. The method 500 proceeds to block 510, which includes setting a Tbl_pointer to equal a Victim_Scan_Pointer.

The method 500 proceeds to block 515, which includes setting a DLI_CNT to zero. In one embodiment, the DLI_CNT is a counter counting the number of processes involved in deadlocks are reported. Setting DLI_CNT to zero may be one initialization measure of the method 500.

The method 500 proceeds to block 520, which includes clearing a DEADLOCK_INFO_TABLE. Clearing DEADLOCK_INFO_TABLE may be one initialization measure of the method 500. In one embodiment, the DEADLOCK_INFO_TABLE is a table that includes up to nine processes other than the victim itself that may involve in a deadlock.

The method 500 proceeds to block 525, which includes determining whether Tbl_Pointer points to a last entry in a Victim_Selection_List. If the determination at 525 is "no," the method 500 proceeds to block 530. If the determination at 525 is "yes," the method 500 may proceed to any appropriate steps.

The method 500 proceeds to block 530, which includes determining whether Tbl_Pointer equals Victim_Pointer. If the determination at 530 is "yes," the method proceeds to block 550. If the determination at 530 is "no," the method proceeds to block 535.

The method 500 proceeds to block 535, which includes incrementing DLI_CNT. In one embodiment, block 535 can be expressed in C language as DLI_CNT=DLI_CNT+1.

The method 500 proceeds to block 540, which includes writing a RECORD_LOCK pinted by the Tbl_Pointer to the DEADLOCK_INFO_TABLE. In one embodiment, RECORD_LOCK includes identification information of a process that involves in a deadlock. In one embodiment, the RECORD_LOCK may be one entry extracted from Victim_Selection_List.

The method 500 proceeds to block 545, which includes determining whether DLI_CNT equals MAX_DLI, wherein MAX_DLI can be any positive integer. In one embodiment, MAX_DLI can be ten. If the determination at 545 is "no," the method 500 proceeds to block 550. If the determination at 545 is "yes," the method 500 may terminate or proceed to any other step(s) appropriate.

The method 500 proceeds to block 550, which includes incrementing Tbl_Pointer. After block 550, the method 500 proceeds to block 525.

Figure 6A:
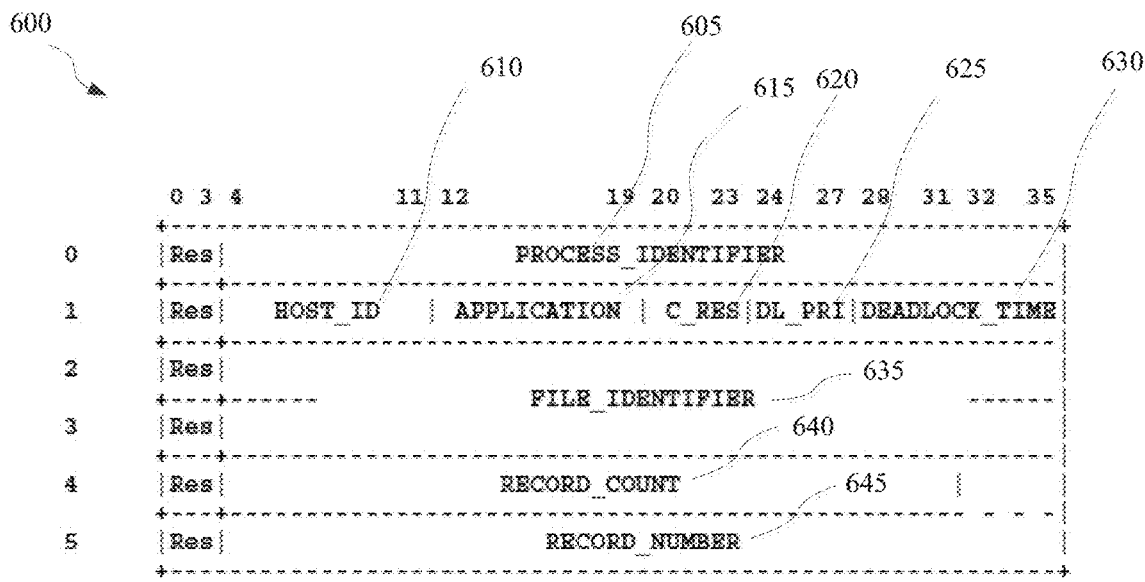
FIG. 6A is an example of a deadlock report according to one embodiment of the disclosure.
Figure 7A:
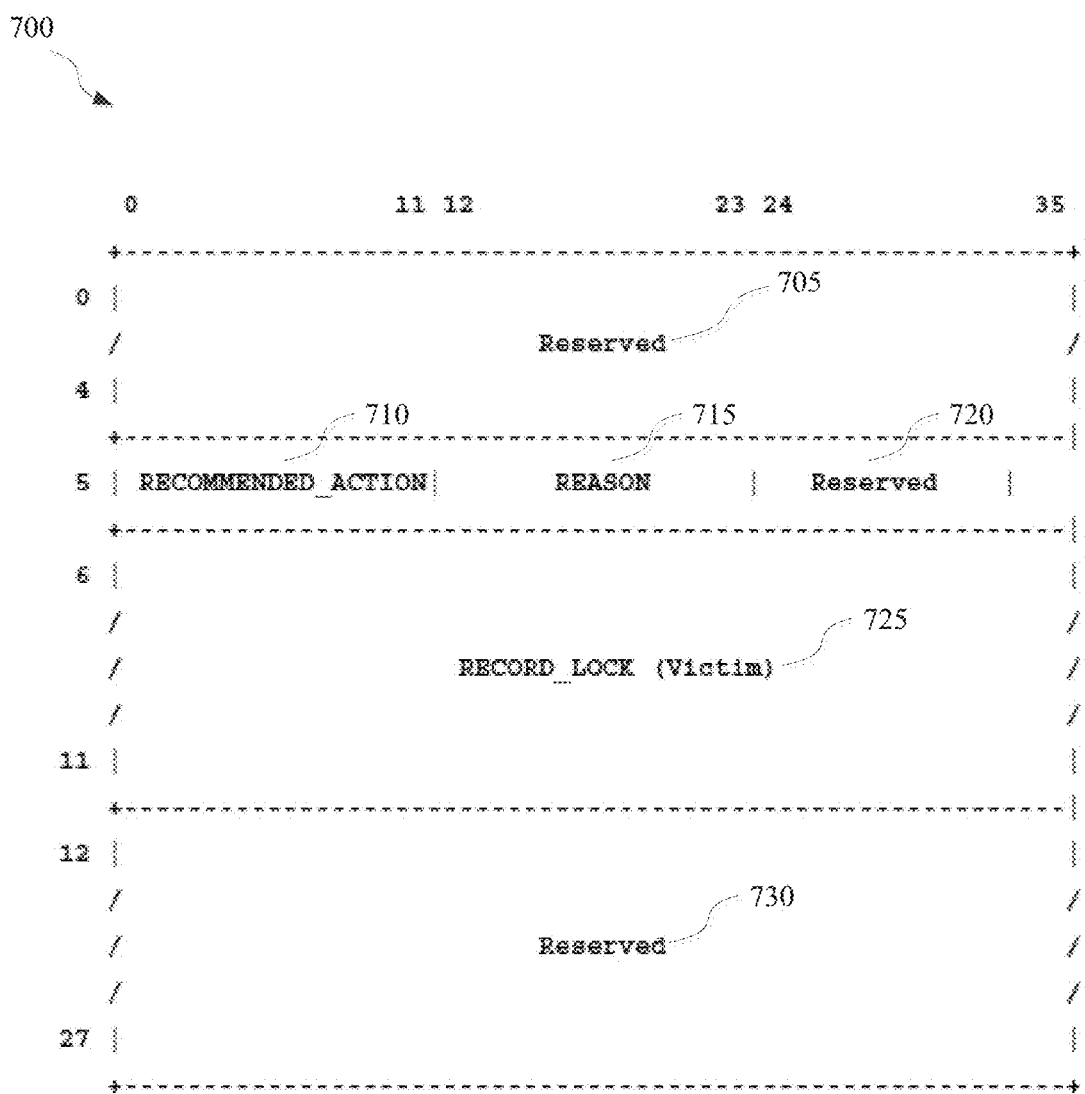
FIG. 7A is an example of a delayed response message (DRM) according to one embodiment of the disclosure.

FIG. 6A is an example of a deadlock report 600 according to one embodiment of the disclosure. The deadlock report 600 can be implemented by any component of a clustered database, e.g., the clustered database 100). In one embodiment, the deadlock report 600 may be implemented in the lock engine 135. The deadlock report 600 can be included in method 200. For example, the deadlock report 600 can be included in block 250. The deadlock report 600 can be included in method 300. For example, deadlock report 600 can be included in block 345. The deadlock report 600 can be generated in combination with method 400. The deadlock report 600 can be generated in combination with method 500. The deadlock report 600 can be used in combination with DRM 700 and 750. The deadlock report 600 can be implemented by any component of the computer network 800 shown in FIG. 8. The deadlock report 600 can be implemented in the computer system 900 shown in FIG. 9. The deadlock report 600 can be implemented in the servers 1000 and 1050. In one embodiment, the deadlock report 600 can be implemented in the emulated environment 1008. In FIG. 6A, "Res" means reserved memory capacity.

PROCESS_IDENTIFIER 605 may identify the process that owns the lock.

HOST_ID 610 may identify the host the process represents.

APPLICATION 615 may identify the application the process represents.

C_RES 620 may be conflict resolution. If a deadlock happens, C_RES may indicate the resolution of the deadlock.

DL_PRI 625 may be deadlock priority. In one embodiment, DL_PRI has three values: 0, 1, and 2. The value zero represents the highest priority; the value one represents the middle priority; the value two represents the lowest priority.

DEADLOCK_TIME 630 may be the value used for a deadlock timer.

FILE_IDENTIFIER 635 may identify the file containing the object (the desired resource by the process). FILE_IDENTIFIER 635 may be in any format applicable.

RECORD_COUNT 640 may identify the number of logically contiguous records containing the object.

RECORD_NUMBER 645 may identify the number of the first record containing the object. RECORD_NUMBER 645 is related to the start of the file identified by FILE_IDENTIFIER 635.

Figure 6B:
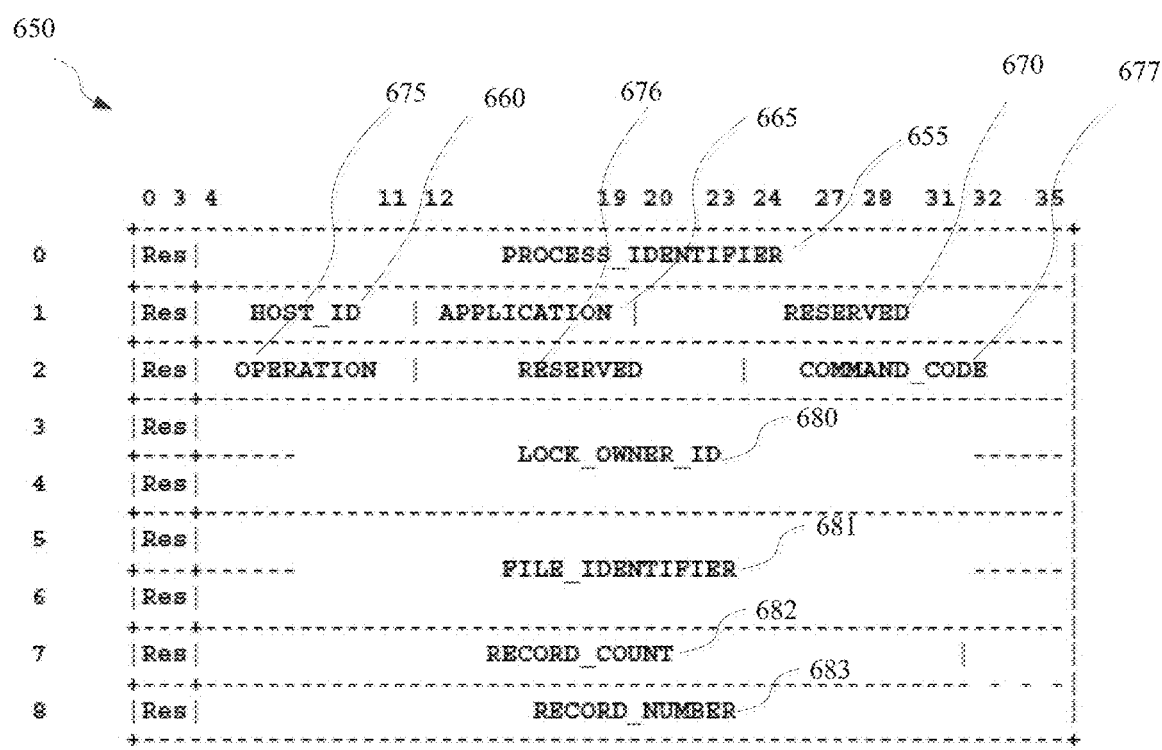
FIG. 6B is an example of a deadlock report according to one embodiment of the disclosure.

FIG. 6B is an example of a deadlock report 650 according to one embodiment of the disclosure. The deadlock report 650 can be implemented by any component of a clustered database, e.g., the clustered database 100. In one embodiment, the deadlock report 650 may be implemented in the lock engine 135. The deadlock report 650 can be included in method 200. For example, the deadlock report 650 can be included in block 250. The deadlock report 650 can be included in method 300. For example, deadlock report 650 can be included in block 345. The deadlock report 650 can be generated in combination with method 400. The deadlock report 650 can be generated in combination with method 500. The deadlock report 650 can be used in combination with DRM 700 and 750. The deadlock report 650 can be implemented by any component of the computer network 800 shown in FIG. 8. The deadlock report 650 can be implemented in the computer system 900 shown in FIG. 9. The deadlock report 650 can be implemented in the servers 1000 and 1050. In one embodiment, the deadlock report 650 can be implemented in the emulated environment 1008. In FIG. 6B, "Res" means reserved memory capacity.

PROCESS_IDENTIFIER 655 may identify the process that owns the lock.

HOST_ID 660 may identify the host the process represents.

APPLICATION 665 may identify the application the process represents.

OPERATION 675 may be the operation code of the lock request, e.g., Universal Data System (UDS) operation code.

COMMAND CODE 677 may be the command code of the lock request for this lock object.

LOCK_OWNER_ID 680 may uniquely identify the requestor of the lock.

FILE_IDENTIFIER 681 may identify the file containing the object (the desired resource by the process).

RECORD_COUNT 682 may identify the number of logically contiguous records containing the object.

RECORD_NUMBER 683 may identify the number of the first record containing the object. RECORD_NUMBER 683 is related to the start of the file identified by FILE_IDENTIFIER.

FIG. 7A is an example of a delayed response message (DRM) 700 according to one embodiment of the disclosure. The DRM 700 can be implemented by any component of a clustered database, e.g., the clustered database 100. In one embodiment, the DRM 700 may be implemented in the lock engine 135. The DRM 700 can be included in method 200. For example, the DRM 700 can be included in block 250. The DRM 700 can be included in method 300. For example, the DRM 700 can be included in block 345. The DRM 700 can be generated by method 400. The DRM 700 can be generated by method 500. The DRM 700 can be used in combination with deadlock reports 600 and 650. The DRM 700 can be implemented by any component of the computer network 800 shown in FIG. 8. The DRM 700 can be implemented in the computer system 900 shown in FIG. 9. The DRM 700 can be implemented in the servers 1000 and 1050. In one embodiment, the DRM 700 can be implemented in the emulated environment 1008. In FIG. 7A, "Reserved" means reserved memory capacity.

RECOMMENDED_ACTION 710 may be the recommended action status that will be sent to the host.

REASON 715 may be the reason status associated with the recommended action.

RECORD_LOCK 725 may identify the request causing the deadlock.

FIG. 7B is an example of a delayed response message (DRM) 750 according to one embodiment of the disclosure. The DRM 750 can be implemented by any component of a clustered database, e.g., the clustered database 100. In one embodiment, the DRM 750 may be implemented in the lock engine 135. The DRM 750 can be included in method 200. For example, the DRM 750 can be included in block 250. The DRM 750 can be included in method 300. For example, the DRM 750 can be included in block 345. The DRM 750 can be generated by method 400. The DRM 750 can be generated by method 500. The DRM 750 can be used in combination with deadlock reports 600 and 650. The DRM 750 can be implemented by any component of the computer network 800 shown in FIG. 8. The DRM 750 can be implemented in the computer system 900 shown in FIG. 9. The DRM 750 can be implemented in the servers 1000 and 1050. In one embodiment, the DRM 750 can be implemented in the emulated environment 1008. In FIG. 7B, "Reserved" means reserved memory capacity.

RECOMMENDED_ACTION 756 may be the recommended action status that will be sent to the host.

REASON 757 may be the reason status associated with the recommended action.

COMMAND_CODE 758 may be the command code for the lock command that put the victim on the wait list.

LOCK_REQ_ID 759 may identify the request.

PROGRAM_ID 761 may identify the program that contains the command code requesting the lock.

DL_PART_RPT 763 may be a flag that indicates that the entries in the DEADLOCK INFO TABLE are incomplete. This flag may only be non-zero if the REASON is deadlock.

DLI_CNT 764 may be the number of entries in the DEADLOCK INFO TABLE. This counter may only be non-zero if the REASON is deadlock.

DEADLOCK INFO TABLE 765 may include up to 10 entries (including the victim itself). Each entry contains a LOCK_REQ_ID of a conflicting lock request.

Figure 8:
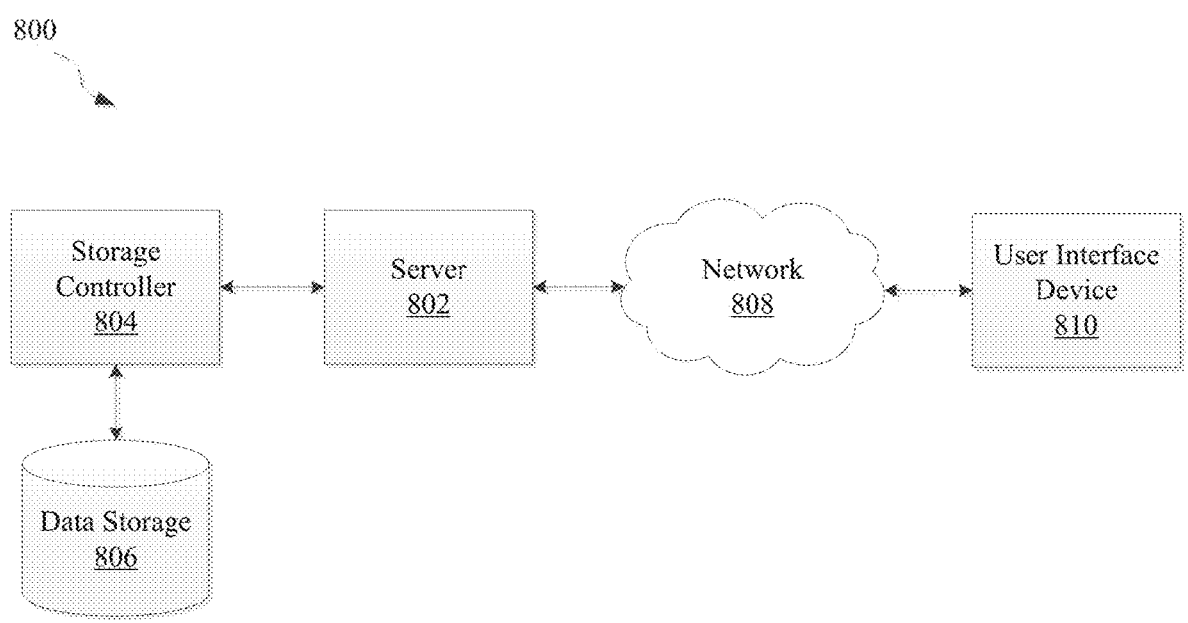
FIG. 8 is a block diagram illustrating a computer network according to one embodiment of the disclosure.

FIG. 8 illustrates a computer network 800 for obtaining access to database files in a computing system according to one embodiment of the disclosure. The system 800 may include a server 802, a data storage device 806, a network 808, and a user interface device 810. The server 802 may also be a hypervisor-based system executing one or more guest partitions hosting operating systems with modules having server configuration information. In a further embodiment, the system 800 may include a storage controller 804, or a storage server configured to manage data communications between the data storage device 806 and the server 802 or other components in communication with the network 808. In an alternative embodiment, the storage controller 804 may be coupled to the network 808.

In one embodiment, the user interface device 810 is referred to broadly and is intended to encompass a suitable processor-based device such as a desktop computer, a laptop computer, a personal digital assistant (PDA) or tablet computer, a smartphone or other mobile communication device having access to the network 808. In a further embodiment, the user interface device 810 may access the Internet or other wide area or local area network to access a web application or web service hosted by the server 802 and may provide a user interface for enabling a user to enter or receive information.

The network 808 may facilitate communications of data between the server 802 and the user interface device 810. The network 808 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

In one embodiment, the user interface device 810 accesses the server 802 through an intermediate server (not shown), e.g., a workstation for XPC. For example, in a cloud application the user interface device 810 may access an application server. The application server fulfills requests from the user interface device 810 by accessing a database management system (DBMS). In this embodiment, the user interface device 810 may be a computer or phone executing a Java application making requests to a JBOSS server executing on a Linux server, which fulfills the requests by accessing a relational database management system (RDMS) on a mainframe server.

FIG. 9 illustrates a computer system 900 adapted according to certain embodiments of the server 802 and/or the user interface device 810. The central processing unit ("CPU") 902 is coupled to the system bus 904. The CPU 902 may be a general purpose CPU or microprocessor, graphics processing unit ("GPU"), and/or microcontroller. The present embodiments are not restricted by the architecture of the CPU 902 so long as the CPU 902, whether directly or indirectly, supports the operations as described herein. The CPU 902 may execute the various logical instructions according to the present embodiments.

The computer system 900 may also include random access memory (RAM) 908, which may be synchronous RAM (SRAM), dynamic RAM (DRAM), synchronous dynamic RAM (SDRAM), or the like. The computer system 900 may utilize RAM 908 to store the various data structures used by a software application. The computer system 900 may also include read only memory (ROM) 906 which may be PROM, EPROM, EEPROM, optical storage, or the like. The ROM may store configuration information for booting the computer system 900. The RAM 908 and the ROM 906 hold user and system data, and both the RAM 908 and the ROM 906 may be randomly accessed.

The computer system 900 may also include an I/O adapter 910, a communications adapter 914, a user interface adapter 916, and a display adapter 922. The I/O adapter 910 and/or the user interface adapter 916 may, in certain embodiments, enable a user to interact with the computer system 900. In a further embodiment, the display adapter 922 may display a graphical user interface (GUI) associated with a software or web-based application on a display device 924, such as a monitor or touch screen.

The I/O adapter 910 may couple one or more storage devices 912, such as one or more of a hard drive, a solid state storage device, a flash drive, a compact disc (CD) drive, a floppy disk drive, and a tape drive, to the computer system 900. According to one embodiment, the data storage 912 may be a separate server coupled to the computer system 900 through a network connection to the I/O adapter 910. The communications adapter 914 may be adapted to couple the computer system 900 to the network 808, which may be one or more of a LAN, WAN, and/or the Internet. The user interface adapter 916 couples user input devices, such as a keyboard 920, a pointing device 918, and/or a touch screen (not shown) to the computer system 900. The display adapter 922 may be driven by the CPU 902 to control the display on the display device 924. Any of the devices 902-922 may be physical and/or logical.

The applications of the present disclosure are not limited to the architecture of computer system 900. Rather the computer system 900 is provided as an example of one type of computing device that may be adapted to perform the functions of the server 802 and/or the user interface device 910. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 900 may be virtualized for access by multiple users and/or applications.

FIG. 10A is a block diagram illustrating a server 1000 hosting an emulated software environment for virtualization according to one embodiment of the disclosure. An operating system 1002 executing on a server 1000 includes drivers for accessing hardware components, such as a networking layer 1004 for accessing the communications adapter 1014. The operating system 1002 may be, for example, Linux or Windows. An emulated environment 1008 in the operating system 1002 executes a program 1010, such as Communications Platform (CPComm) or Communications Platform for Open Systems (CPCommOS). The program 1010 accesses the networking layer 1004 of the operating system 1002 through a non-emulated interface 1006, such as extended network input output processor (XNIOP). The non-emulated interface 1006 translates requests from the program 1010 executing in the emulated environment 1008 for the networking layer 1004 of the operating system 1002.

In another example, hardware in a computer system may be virtualized through a hypervisor. FIG. 10B is a block diagram illustrating a server 1050 hosting an emulated hardware environment according to one embodiment of the disclosure. Users 1052, 1054, 1056 may access the hardware 1060 through a hypervisor 1058. The hypervisor 1058 may be integrated with the hardware 1058 to provide virtualization of the hardware 1058 without an operating system, such as in the configuration illustrated in FIG. 10A. The hypervisor 1058 may provide access to the hardware 1058, including the CPU 1002 and the communications adaptor 1014.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, comprising:
retrieving, by a processor, a first entry from a global wait list as a current waiting lock;
decreasing, by the processor, a deadlock timer of the current waiting lock;
determining, by the processor, whether the deadlock timer has reached a limit;

adding, by the processor, the current waiting lock to a deadlock victim selection list, if the deadlock timer has reached a limit;

selecting, by the processor, a victim from the deadlock victim selection list;

constructing, by the processor, a deadlock report identifying at least one process involved in a current deadlock, the deadlock report including a delayed response message (DRM) corresponding to the victim and including deadlock occurrence information indicative of a cause of the deadlock; and deleting, by the processor, the victim from the global wait list.

2. The method according to claim 1, wherein the selecting, by the processor, a victim from the deadlock victim selection list further includes determining, by the processor, whether a first entry pointed by a victim scan pointer has a deadlock priority less than a second entry pointed by a victim pointer; and selecting, by the processor, the first entry pointed by the victim pointer to be the victim, if the first entry has a deadlock priority less than the second entry.

3. The method according to claim 2, further including deleting, by the processor, the victim from a local wait list of a host that hosts the victim;

appending, by the processor, the victim to a free space list; and sending, by the processor, the DRM to the host.

4. The method according to claim 1, wherein the DRM includes at least two entries involved in deadlocks.

5. The method according to claim 1, further including determining, by the processor, whether the current waiting lock is a last entry in the global wait list; and retrieving, by the processor, a next entry from the global wait list as the current waiting lock.

6. The method according to claim 1, further including determining, by the processor, whether the global wait list is empty.

7. The method of claim 1, wherein the global wait list represents a set of processes that are each waiting for a resource, and wherein the current waiting lock represents a first process that is waiting for a resource.

8. A computer program product, comprising:

a non-transitory computer-readable medium comprising instructions which, when executed by a processor of a computing system, cause the processor to perform;

retrieving a first entry from a global wait list as a current waiting lock;

decreasing a deadlock timer of the current waiting lock;

determining whether the deadlock timer has reached a limit;

adding, by the processor, the current waiting lock to a deadlock victim selection list, if the deadlock timer has reached a limit;

selecting, by the processor, a victim from the deadlock victim selection lists;

constructing, by the processor, a deadlock report identifying at least one process involved in a current deadlock, the deadlock report including a delayed response message (DRM) corresponding to the victim and including deadlock occurrence information indicative of a cause of the deadlock; and deleting, by the processor, the victim from the global wait list.

9. The computer program product of claim 8, wherein the selecting a victim from the deadlock victim selection list further includes determining whether a first entry pointed by a victim scan pointer has a deadlock priority less than a second entry pointed by a victim pointer; and selecting the first entry pointed by the victim pointer to be the victim, if the first entry has a deadlock priority less than the second entry.

10. The computer program product of claim 9, further including:

deleting the victim from a local wait list of a host that hosts the victim;

appending the victim to a free space list; and sending the DRM to the host.

11. The computer program product of claim 8, wherein the DRM includes at least two entries involved in deadlocks.

12. The computer program product of claim 8, further including determining whether the current waiting lock is a last entry in the global wait list; and retrieving a next entry from the global wait list as the current waiting lock.

13. The computer program product of claim 8, further including determining whether the global wait list is empty.

14. The computer program product of claim 8, wherein the global wait list represents a set of processes that are each waiting for a resource, and wherein the current waiting lock represents a first process that is waiting for a resource.

15. An apparatus, comprising:

a memory; and a processor coupled to the memory, the processor being configured to perform:

retrieving a first entry from a global wait list as a current waiting lock;

decreasing a deadlock timer of the current waiting lock;

determining whether the deadlock timer has reached a limit;

adding, by the processor, the current waiting lock to a deadlock victim selection list, if the deadlock timer has reached a limit;

selecting, by the processor, a victim from the deadlock victim selection list;

constructing, by the processor, a deadlock report identifying at least one process involved in a current deadlock, the deadlock report including a delayed response message (DRM) corresponding to the victim and including deadlock occurrence information indicative of a cause of the deadlock; and deleting, by the processor, the victim from the global wait list.

16. The apparatus of claim 15, wherein selecting the victim from the deadlock victim selection list further includes:

determining whether a first entry pointed by a victim scan pointer has a deadlock priority less than a second entry pointed by a victim pointer; and selecting the first entry pointed by the victim pointer to be the victim, if the first entry has a deadlock priority less than the second entry.

17. The apparatus of claim 16, further including deleting the victim from a local wait list of a host that hosts the victim; appending the victim to a free space list; and sending the DRM to the host.

18. The apparatus of claim 5, wherein the DRM includes at least two entries involved in deadlocks, each entry representing a process.

19. The apparatus of claim 15, further including determining whether the current waiting lock is a last entry in the global wait list; and retrieving a next entry from the global wait list as the current waiting lock.

20. The apparatus of claim 15, wherein the global wait list represents a set of processes that are each waiting for a resource, and wherein the current waiting lock represents a first process that is waiting for a resource.

\* \* \* \* \*